(12) United States Patent
Dharmasiri et al.

(10) Patent No.: US 11,760,224 B1
(45) Date of Patent: Sep. 19, 2023

(54) VEHICLE CHARGING SYSTEM

(71) Applicant: Electric Era Technologies Inc., Seattle, WA (US)

(72) Inventors: Hasitha Keerthi Dharmasiri, Seattle, WA (US); John Nathan Warila, Seattle, WA (US)

(73) Assignee: Electric Era Technologies, Inc., Seattle, WA (US)

( * ) Notice: Subject to any disclaimer, the term of this patent is extended or adjusted under 35 U.S.C. 154(b) by 0 days.

(21) Appl. No.: 17/817,185

(22) Filed: Aug. 3, 2022

(51) Int. Cl.
| | |
|---|---|
| *B60L 53/00* | (2019.01) |
| *B60L 53/67* | (2019.01) |
| *B60L 53/53* | (2019.01) |
| *B60L 53/63* | (2019.01) |
| *H02J 7/00* | (2006.01) |
| *H02J 7/34* | (2006.01) |
| *B60L 53/64* | (2019.01) |

(52) U.S. Cl.
CPC .............. *B60L 53/67* (2019.02); *B60L 53/53* (2019.02); *B60L 53/63* (2019.02); *B60L 53/64* (2019.02); *H02J 7/00712* (2020.01); *H02J 7/342* (2020.01)

(58) Field of Classification Search
CPC .......... B60L 53/63; B60L 53/53; B60L 53/64; B60L 53/67; H02J 7/00712; H02J 7/342
See application file for complete search history.

(56) References Cited

U.S. PATENT DOCUMENTS

| | | | | |
|---|---|---|---|---|
| 7,693,609 B2 * | 4/2010 | Kressner | ............... | B60L 53/305 |
| | | | | 700/297 |
| 7,949,435 B2 * | 5/2011 | Pollack | .................. | G06Q 50/06 |
| | | | | 315/80 |
| 8,019,697 B2 * | 9/2011 | Ozog | ............... | G06Q 10/06315 |
| | | | | 705/400 |
| 8,957,634 B2 * | 2/2015 | Lo | ......................... | H02J 7/0013 |
| | | | | 700/286 |
| 8,972,074 B2 * | 3/2015 | Tyagi | ................. | G06Q 10/0631 |
| | | | | 700/286 |

(Continued)

FOREIGN PATENT DOCUMENTS

| | | | |
|---|---|---|---|
| CN | 114475331 A | * | 5/2022 |
| KR | 101297079 B1 | | 8/2013 |

(Continued)

*Primary Examiner* — Naum Levin
(74) *Attorney, Agent, or Firm* — Dority & Manning, P.A.

(57) ABSTRACT

A charging network includes one or more charging systems configured to be electrically coupled with a power source. The charging system includes a grid interconnect, a battery energy storage system electrically coupled with the grid interconnect, a charging station electrically coupled with the grid interconnect and the battery energy storage system in parallel, and a computing system. The computing system is configured to determine a requested power load by the charging station at a defined time; determine a defined power value of the grid interconnect; determine one or more charging parameters based at least in part on the requested power load by the charging station at the defined time and the defined power value of the grid interconnect; and generate one or more commands for the battery energy storage system or the charging station to provide a power load based on the one or more charging parameters.

19 Claims, 6 Drawing Sheets

(56) References Cited

U.S. PATENT DOCUMENTS

| | | | |
|---|---|---|---|
| 9,041,349 B2* | 5/2015 | Bemmel | H02J 7/0013 |
| | | | 320/109 |
| 9,106,101 B2* | 8/2015 | Senart | B60L 53/68 |
| 9,260,031 B2* | 2/2016 | Ghosh | B60L 53/65 |
| 9,283,862 B2* | 3/2016 | Bridges | B60L 53/68 |
| 9,440,547 B2* | 9/2016 | Buia | B60L 3/0046 |
| 9,620,970 B2* | 4/2017 | Gadh | H02J 1/14 |
| 9,843,187 B2* | 12/2017 | Uyeki | B60L 53/66 |
| 10,169,783 B2* | 1/2019 | Khoo | G06Q 30/0206 |
| 10,926,659 B2* | 2/2021 | Lee | B60L 53/51 |
| 11,270,243 B1 | 3/2022 | Roy et al. | |
| 11,381,101 B1* | 7/2022 | Mallia | H02J 7/0048 |
| 2010/0076835 A1* | 3/2010 | Silverman | G06Q 30/0233 |
| | | | 705/14.33 |
| 2011/0016063 A1* | 1/2011 | Pollack | B60L 53/63 |
| | | | 320/155 |
| 2012/0074901 A1 | 3/2012 | Mohammed | |
| 2012/0197693 A1* | 8/2012 | Karner | B60L 50/20 |
| | | | 705/14.1 |
| 2012/0253567 A1* | 10/2012 | Levy | B60L 53/63 |
| | | | 701/22 |
| 2013/0026986 A1* | 1/2013 | Parthasarathy | H02J 3/14 |
| | | | 320/109 |
| 2013/0046411 A1* | 2/2013 | Al Faruque | G06Q 10/06315 |
| | | | 700/286 |
| 2014/0324510 A1* | 10/2014 | Vardhan | G06Q 30/0202 |
| | | | 705/7.31 |
| 2016/0026659 A1* | 1/2016 | Harley | H04W 4/44 |
| | | | 707/758 |
| 2016/0236585 A1* | 8/2016 | Miftakhov | B60L 53/63 |
| 2017/0005515 A1* | 1/2017 | Sanders | H02J 3/381 |
| 2019/0378648 A1* | 12/2019 | Pratt | H02P 13/06 |
| 2020/0023747 A1* | 1/2020 | Logvinov | B60L 55/00 |
| 2021/0003974 A1* | 1/2021 | Yang | H02J 3/32 |
| 2022/0009372 A1* | 1/2022 | Bhargava | B60L 58/22 |
| 2022/0085612 A1* | 3/2022 | Horii | B60L 53/63 |
| 2022/0089055 A1* | 3/2022 | TenHouten | H02J 7/00034 |
| 2022/0305940 A1* | 9/2022 | Kobuna | B60L 53/67 |

FOREIGN PATENT DOCUMENTS

| | | | | |
|---|---|---|---|---|
| RU | 2550109 C2 * | 5/2015 | | B60L 53/14 |
| WO | WO-2017011373 A1 * | 1/2017 | | B60L 11/1838 |
| WO | WO-2022241267 A1 * | 11/2022 | | |

* cited by examiner

VEHICLE CHARGING SYSTEM

FIELD OF THE INVENTION

The present disclosure generally relates to charging systems, which may be implemented at one or more remote sites (or access locations).

BACKGROUND OF THE INVENTION

In general, utility companies determine how to allocate energy resources based on continuously varied supply and demand. As such, electric vehicle (EV) charging systems may be limited in power, leading to varied charging times. With the increased adoption of electric vehicles, it becomes increasingly challenging to balance the grid and ensure the reliability of supply. as such, charging systems and methods for use of the charging systems that can increase the efficiency of EV charging sites would be welcomed by the industry.

SUMMARY OF THE INVENTION

Aspects and advantages of the invention will be set forth in part in the following description, or may be obvious from the description, or may be learned through practice of the invention.

According to some aspects of the present disclosure, a charging network includes a charging system configured to be electrically coupled with a power source. The charging system includes a grid interconnect, a battery energy storage system electrically coupled with the grid interconnect, a charging station electrically coupled with the grid interconnect and the battery energy storage system in parallel, and a computing system operably coupled with the battery energy storage system and the charging station. The computing system including a processor and associated memory, the memory storing instructions that, when implemented by the processor, configure the computing system to determine a requested power load by the charging station at a defined time; determine a defined power value of the grid interconnect; determine one or more charging parameters based at least in part on the requested power load by the charging station at the defined time and the defined power value of the grid interconnect; and generate one or more commands for the battery energy storage system or the charging station to provide a power load based on the one or more charging parameters.

According to some aspects of the present disclosure, a method for operating a charging network includes receiving a requested power load by the charging station at a defined time. The method also includes determining a defined power value of the grid interconnect. The method further includes determining one or more charging parameters based at least in part on the requested power load by the charging station at the defined time and the defined power value of the grid interconnect. Lastly, the method includes generating one or more commands for the battery energy storage system or the charging station to provide a power load based on the one or more charging parameters.

These and other features, aspects, and advantages of the present technology will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify a location or importance of the individual components. Moreover, for purposes of convenience and clarity only, directional terms, such as top, bottom, left, right, up, down, over, above, below, beneath, rear, back, and front, may be used with respect to the accompanying drawings. These and similar directional terms should not be construed to limit the scope of the disclosure in any manner. Thus, it will be appreciated that the apparatus and/or any component described here may be oriented in one or more orientations that are rotationally offset from those illustrated without departing from the scope of the present disclosure.

The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to electrical power flow through a system. For example, "upstream" refers to the direction from which the electrical power flows, and "downstream" refers to the direction in which the electrical power flows. The term "selectively" refers to a component's ability to operate in various states (e.g., an ON state and an OFF state) based on manual and/or automatic control of a component.

The singular forms "a," "an," and "the" include plural references unless the context clearly dictates otherwise. In addition, the term "each" may be used interchangeably with "any" for any feature described herein.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein will be considered exemplary.

Here and throughout the specification and claims, range limitations are combined, and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to systems and methods for a charging network that includes one or more charging system systems that may be implemented at one or more remote sites or locations. Each charging system can include a combined battery and charger control system for optimization at EV charging sites using vehicle charging session data for load prediction. In several examples, each charging system may be configured to be electrically coupled with a power source, such as the grid to provide power to the charging system. However, the power source may be any other type of power course that provides electrical power to one or of the charging systems, such as solar power, wind generated power, and/or any other manner of generating power.

In various examples, each charging system can include a grid interconnect that is electrically couplable to the power source. A battery energy storage system may be electrically coupled with the grid interconnect. In addition, a charging station may be electrically coupled with the grid interconnect and the battery energy storage system in parallel. The charging station is configured to transfer power therefrom to an electrical resource, such as an electrical vehicle. Although electrical energy and electrical power are not the same, these terms are generally used interchangeably herein.

A computing system is operably coupled with the battery energy storage system and the charging station. The computing system including a processor and associated memory, the memory storing instructions that, when implemented by the processor, configure the computing system to determine a requested power load by the charging station at a defined time and/or determine a defined power value of the grid interconnect. In turn, the computing system may determine one or more charging parameters based at least in part on the requested power load by the charging station at the defined time and the defined power value of the grid interconnect. The computing system may further generate one or more commands for the battery energy storage system or the charging station to provide a power load based on the one or more charging parameters.

As such, the charging network described herein can provide system and methods for controlling various assets at an electric resource (e.g., electric vehicle (EV)) charging site such that the charging network determines a power limit of each respective charging station that supply power to the electric resource and/or determines a charge/discharge command for the stationary battery energy storage system with the capability to charge or discharge into a common AC or DC distribution assembly that is electrically connected to the charging station. By controlling the various assets with the computing system, a more constant power draw (a term known as "peak shaving") may be accomplished for the purposes of minimizing demand charges by electric utility companies for the customer. Additionally or alternatively, the power draw of each charging system and/or charging station may be maintained below a defined power value, while allowing the power consuming items at the site to collectively and periodically exceed that limit with supplemental power being provided by the battery energy storage system.

In some instances, the computing system may calculate an economically optimal usage of site-level battery storage energy given historical knowledge about vehicle sessions at the charging site (e.g., charging site utilization). As such, the charging network described herein may form a high-quality charging experience for users of an EV charging site, without requiring that site to meet the nameplate power capacity of its installed chargers, and without incurring exorbitant demand charges that may be present on the charging station operator's utility tariff. Moreover, due to the charging network described herein tracks vehicle traffic and power requests, which may be contributors to generating transient loads seen in the load profile, the charging network provides a stronger, more sensitive prediction of peak loads and therefore allows a more aggressive peak shave target, ultimately resulting in increased economic benefit to the customer. Additionally, the charging network described herein can provide fast and secure control of power load generation at a site to allow the operation of EV chargers in situations where the total of the EV charger nameplate power limits exceeds the grid power limit.

Figure 1:
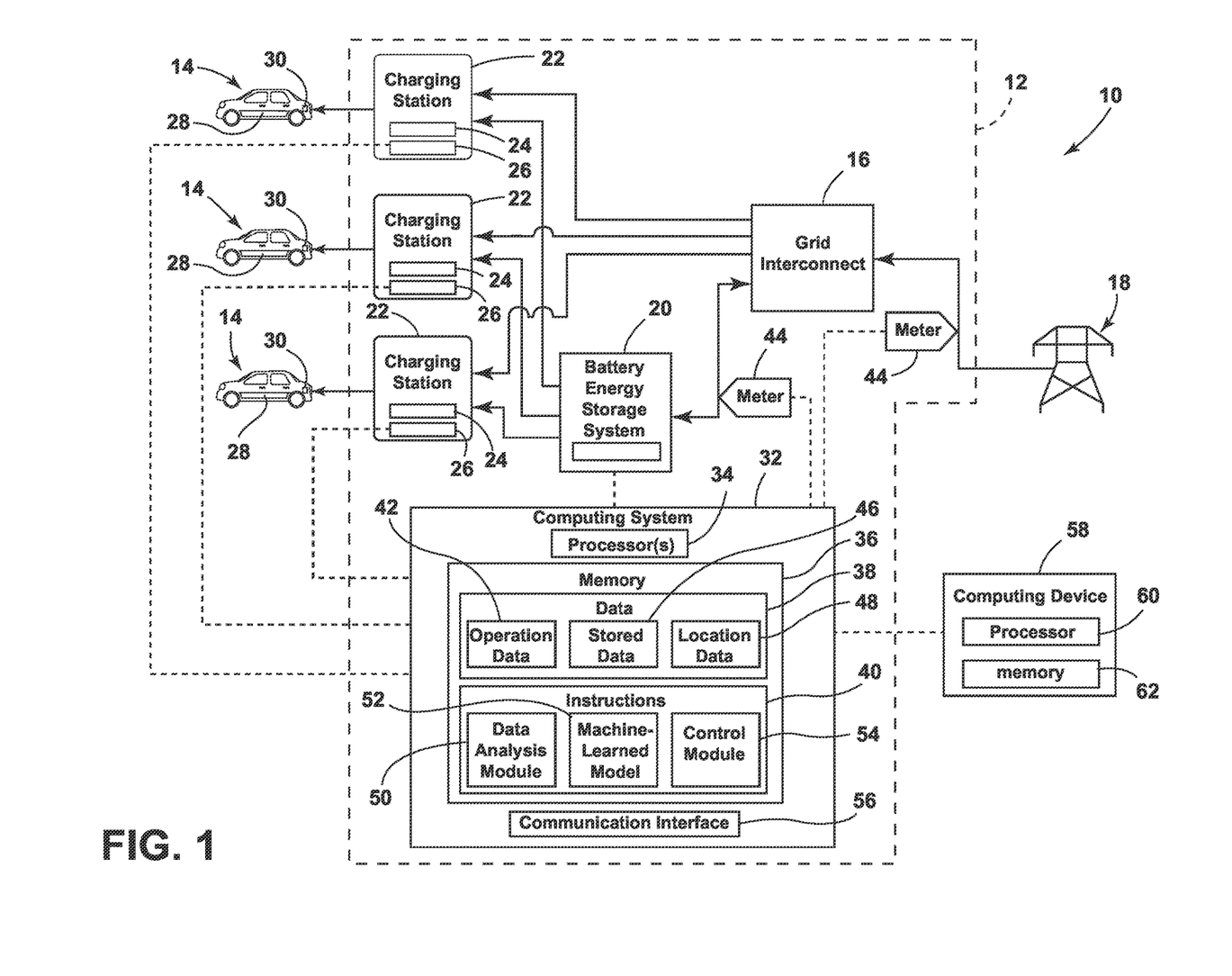
FIG. 1 is a schematic view of a charging system according to some aspects of the present disclosure.

Referring now to FIG. 1, in some embodiments, a charging network 10 that includes one or more charging systems 12 for controlling various electric resources, such as an electric vehicle (EV) 14, at a defined location, such as EV charging site is provided in accordance with various aspects of the present disclosure. For clarity purposes, solid connection lines in FIG. 1 indicate an energy transfer line between two components described herein and dashed lines illustrate communication lines between two components described herein. Moreover, "electric resource" as used herein typically refers to electrical entities that can be commanded to do some or all of these three things: take power (act as load), provide power (act as power generation or source), and store energy. Examples may include battery/ charger/inverter systems for electric or hybrid-electric vehicles, repositories of used-but-serviceable electric vehicle batteries, fixed energy storage, fuel cell generators, emergency generators, controllable loads, etc. "Electric vehicle" is used broadly herein to refer to pure electric and hybrid electric vehicles, such as plug-in hybrid electric vehicles (PHEVs), especially vehicles that have significant storage battery capacity and that connect to a power grid for recharging the battery. More specifically, an electric vehicle means a vehicle that gets some or all of its energy for motion and other purposes from the power grid. Moreover, an electric vehicle has an energy storage system, which may consist of batteries, capacitors, etc., or some combination thereof. An electric vehicle may or may not have the capability to provide power back to the electric grid. It will be appreciated that the charging system 12 provided herein may be implemented and used in any location with any object that may be charged and/or accept electricity for operation thereof.

As illustrated, the charging system 12 can include a grid interconnect 16 that may be operably coupled with a power grid 18. The "power grid" as used herein means a power distribution system/network that connects producers of power with consumers of power. The network may include generators, transformers, interconnects, switching stations, and safety equipment as part of either/both the transmission system (i.e., bulk power) or the distribution system (i.e. retail power). The power aggregation system is vertically scalable for use within a neighborhood, a city, a sector, a control area, or (for example) one of the eight large-scale Interconnects in the North American Electric Reliability Council (NERC). Moreover, the system is horizontally scalable for use in providing power services to multiple grid areas simultaneously.

The charging system 12 may also include a battery energy storage system 20, which may be operably coupled with the grid interconnect 16. The battery energy storage system 20 may consist of one or more of a plurality of individual batteries configured in a series, parallel, or combination of series and parallel connections. In various examples, the battery energy storage system 20 may have a nominal voltage of up to 800 volts (V) and can store 200 kilo-Watt-hours (kWh) of energy. As illustrated, the battery energy storage system 20 may transfer power stored therein to one or more of the charging stations 22 and/or to the grid interconnect 16 so that the power may be provided to the grid 18. As such, in some examples, the battery energy storage system 20 may include power electronic components to form a bi-directional AC-DC converter-inverter that can both convert AC to DC and invert DC to AC using the same circuit topography.

Additionally or alternatively, multiple inverters/converters may be implemented without departing from the scope of the present disclosure.

Each charging system 12 may be remote from the battery energy storage system 20 and the grid interconnect 16 and/or the battery energy storage system 20. In general, each charging system 12 may convert energy from the grid interconnect 16 and/or the battery energy storage system 20, using energy conversion techniques such as, but not limited to, DC to DC conversion, AC to DC conversion, DC to AC conversion, AC to AC conversion, current limiting and voltage regulation, as determined, at least in part, by the charging requirements of the EV 14 that is using power from the charger unit and/or requirements of the vehicle operator (e.g., the vehicle driver, owner, custodian or other person available to specify such requirements). Power may be provided from the charging station 22 to the EV 14 during a charging session that begins when the power is transferred from the charging station to the EV 14 and ceases when power is no longer being transferred. In various instances, the amount of power may vary over time during the charging session as necessary to improve factors including, but not limited to, charger unit efficiency, charge time, battery life, and/or charging cost to the vehicle operator.

In various examples, each charging station 22 may include and/or be operably coupled with a power distribution assembly 24 and/or a controller 26. In general, the power distribution assembly 24 may contain power electronic components to form a bi-directional AC-DC converter-inverter that can both convert AC to DC and invert DC to AC using the same circuit topography. A converter-inverter topography allows the charging system 12 to interchangeably and/or supplementarily use AC power from the grid 18 and/or DC power from the battery energy storage system 20 based on certain conditions, such as when power rates are low cost or when the percentage of renewable energy generation entering the grid 18 is high.

In general, the controller 26 may comprise any suitable processor-based device known in the art, such as a computing device or any suitable combination of computing devices. Thus, in several embodiments, the controller 26 may include one or more processor(s) and associated memory device(s) configured to perform a variety of computer-implemented functions. It will be appreciated that, in several embodiments, the controller 26 may correspond to an existing controller of the charging station 22, or the controller 26 may correspond to a separate processing device.

Each charging station 22 may be respectively coupled with an EV 14 (or other electric resource) for providing power thereto. In various examples, each participating EV 14 or group of local EVs 14 has a corresponding battery assembly 28 and/or a remote power management module 30. In various examples, the charging system 12 may communicate with the remote power management modules 30 distributed peripherally among the EVs 14. The remote power management module 30 may perform several different functions, including, but not limited to, providing the charging system 12 with the statuses of the remote EVs 14; controlling the amount, direction, and timing of power being transferred into or out of a remote EV 14; providing metering of power being transferred into or out of a remote EV 14; providing safety measures during power transfer and changes of conditions in the power grid 18; logging activities; and providing self-contained control of power transfer and safety measures when communication with the charging system 12 is interrupted.

Additionally, the charging system 12 can also include a site computing system 32. In general, the computing system 32 may correspond to any suitable processor-based device (s), such as a computing device or any combination of computing devices. Thus, as shown in FIG. 1, the computing system 32 may generally include one or more processor(s) 34 and associated memory devices 36 configured to perform a variety of computer-implemented functions (e.g., performing the methods, steps, algorithms, calculations, and the like disclosed herein). As used herein, the term "processor" refers not only to integrated circuits referred to in the art as being included in a computer, but also refers to a controller, a microcontroller, a microcomputer, a programmable logic controller (PLC), an application-specific integrated circuit, and other programmable circuits. Additionally, the memory 36 may generally include memory element(s) including, but not limited to, computer-readable medium (e.g., random access memory (RAM)), computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory 36 may generally be configured to store information accessible to the processor(s) 34, including data 38 that can be retrieved, manipulated, created, and/or stored by the processor(s) 34 and instructions 40 that can be executed by the processor(s) 34. While the computing system 32 is shown as a component of the charging system 12, it will be appreciated that the computing system 32 may be remote from the charging system 12 without departing from the scope of the present disclosure.

In several embodiments, the data 38 may be stored in one or more databases. For example, the memory 36 may include an operation database 42 for storing data received from one or more components of the charging system 12. For example, as illustrated, one or more meters 44 may be operably coupled with various connection lines and the sit computing system 32. Each meter 44 may be configured to measure the amount of electric energy in a defined location. For example, as shown in FIG. 1, a first meter 44 may be operably coupled with a connection line between the grid 18 and the grid interconnect 16 (and/or any other position upstream of the grid interconnect 16). As such, the first meter 44 may be capable of measuring the power load that is being provided from the grid 18 to the grid interconnect 16. Additionally or alternatively, a second meter 44 may be operably coupled with a connection line between the grid interconnect 16 and the battery energy storage system 20. As such, the second meter 44 may be capable of measuring a power load that is being transferred from the grid interconnect 16 to the battery energy storage system 20, and/or from the battery energy storage system 20 to the grid interconnect 16. Additionally or alternatively, the controllers of the one or more charging stations 22 may provide operational data to the computing system 32.

Additionally, as shown in FIG. 1, the memory 36 may include stored data in a stored database 46 that includes information or data associated with the charging system 12. The stored data may be calculated or determined by the computing system 32 based on any data accessible to the network 10 (e.g., including data accessed, received, or transmitted from internal data sources and/or external data sources) and/or received from an external source. Moreover, in several embodiments, the memory 36 may also include a location database 48 storing location information about the location of the charging system 12. As will be described in greater detail below, the location data may be used to determine various predicted operating conditions, such as a predicted power load that will be consumed by one or more EVs 14 during a defined time frame.

Referring still to FIG. 1, in several embodiments, the instructions 40 stored within the memory 36 of the computing system 32 may be executed by the processor(s) 34 to implement a data analysis module 50. In general, the data analysis module 50 may be configured to analyze the data to determine one or more charging parameters (e.g., a power load, an energy source to supply the energy (e.g., the grid 18 and/or the battery energy storage system 20), a voltage, a current, an amount of time, and/or any other charging parameters) to the EV 14. In some instances, the data analysis module 50 can cooperatively operate with or otherwise leverage a machine-learned model 52 to analyze the data 42 to determine the one or more charging parameters.

Figure 3:
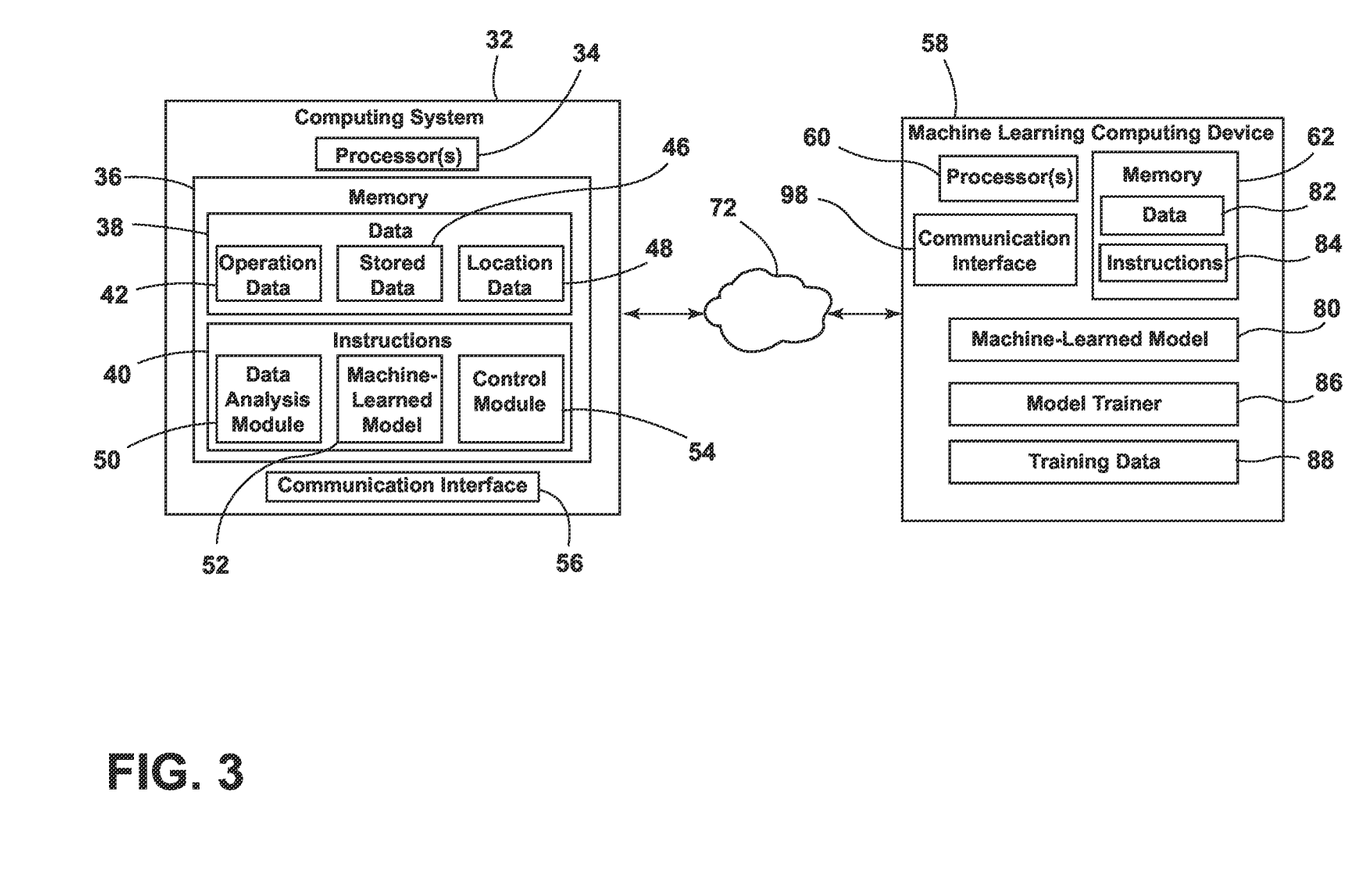
FIG. 3 is a schematic block diagram illustrating portions of the system of FIG. 1 in accordance with aspects of the present subject matter.

Referring still to FIG. 3, the instructions 40 stored within the memory 36 of the computing system 32 may also be executed by the processor(s) 34 to implement a control module 54. In general, the control module 54 may be configured to adjust the operation of the charging system 12 by controlling one or more components of the charging system 12. In several embodiments, the control module 54 may be configured to automatically control the operation of one or more charging system 12 components based at least in part on the data. Thus, the network 10 can reactively manage various charging parameters of each respective charging station 22.

Moreover, as shown in FIG. 1, the computing system 32 may also include a communications interface 56 to communicate with any of the various other system components described herein. For instance, one or more communicative links or interfaces (e.g., one or more data buses and/or wireless connections) may be provided between the communications interface 56 and the meters 44 to allow data transmitted from the meters 44 to be received by the computing system 32. Additionally, as shown in FIG. 1, one or more communicative links or interfaces (e.g., one or more data buses and/or wireless connections) may be provided between the communications interface 56 and the controllers of the charging stations 22 and/or the battery energy storage system 20 to allow the computing system 32 to control the operation of such system components.

Additionally or alternatively, the communications interface may also interface with one or more remote computing device 58 s. In some instances, the computing device 58 may include one or more processor-based devices, such as a given controller or computing device or any suitable combination of controllers or computing devices. Thus, in several embodiments, the computing device 58 may include one or more processor(s), and the associated memory device(s) 62 configured to perform a variety of computer-implemented functions. Additionally, the memory device(s) 62 of the computing device 58 may generally be configured to store suitable computer-readable instructions that, when implemented by the processor(s) 60, configure the computing device 58 to perform various computer-implemented functions, such as one or more aspects of the methods and algorithms that will be described herein. In addition, the computing device 58 may also include various other suitable components, such as a communications circuit or module, one or more input/output channels, a data/control bus, and/or the like. It should be appreciated that the various functions of the computing device 58 may be performed by a single processor-based device or may be distributed across any number of processor-based devices, in which instance such devices may be considered to form part of the computing device 58. For instance, the functions of the computing device 58 may be distributed across multiple application-specific controllers, such as a bicycle controller, a sensor controller, and/or the like.

In operation, the computing system 32 may evaluate available data from one or more power meters 44 at the site, which can at least include the current load profile. In addition, the computing system 32 may evaluate the current load profile and store historical energy data. The computing system 32 may additionally or alternatively receive vehicle session and power consumption data from the one or more charging stations 22, which may be providing energy to an EV 14 and/or free of connection from an EV 14.

In turn, the data analysis module 50 of the computing system 32 may predict vehicle flow and expected power load over defined periods. Additionally or alternatively, the data from the charging system 12 may be provided to the remote computing device 58, which then predicts vehicle flow and expected power load over defined periods for one or more charging systems 12. Additionally or alternatively, the data analysis module 50 may leverage a peak shaving estimation algorithm that produces a peak shave target for the battery energy storage system 20. Additionally or alternatively, the control module 54 may implement a closed-loop control that seeks to operate the battery energy storage system 20 and issues charging parameters, such as power limits to each respective charging station 22, with active sessions to maintain the power load from the grid interconnect 16 below a defined power value. As such, according to some examples, the charging system 12 may define one or more charging parameters (such as a maximum power limit) for one more charging stations 22 that supply power to the EVs 14. For instance, based on the number of EVs 14 and the amount of available energy, the charging system 12 may manage the amount of power provided to each respective charging station 22 independently.

In some examples, the power load provided to each charging station 22 may be varied over time based on one or more factors. For instance, the power load provided may be based on the amount of time that an EV 14 receives energy from the charging station 22. Additionally or alternatively, the power load provided may be based on information provided by the modules of each EV 14. Additionally or alternatively, the power load provided may be at least partially based on the number of resources, the power load provided by the grid 18, and/or the amount of power stored within the battery energy storage system 20.

The amount of power may further be varied based on the predictive models of upcoming changes in the number of EVs 14 that are to be operably coupled with the charging system 12. For example, if the power load provided by the grid 18 is less than the amount to be outputted to the one or more EVs 14, the computing system 32 may supplement the grid power with power from the battery energy storage system 20. Moreover, the power load provided from the grid 18 may be varied based on the energy cost for a defined period, which may be fifteen minutes or less.

Figure 2:
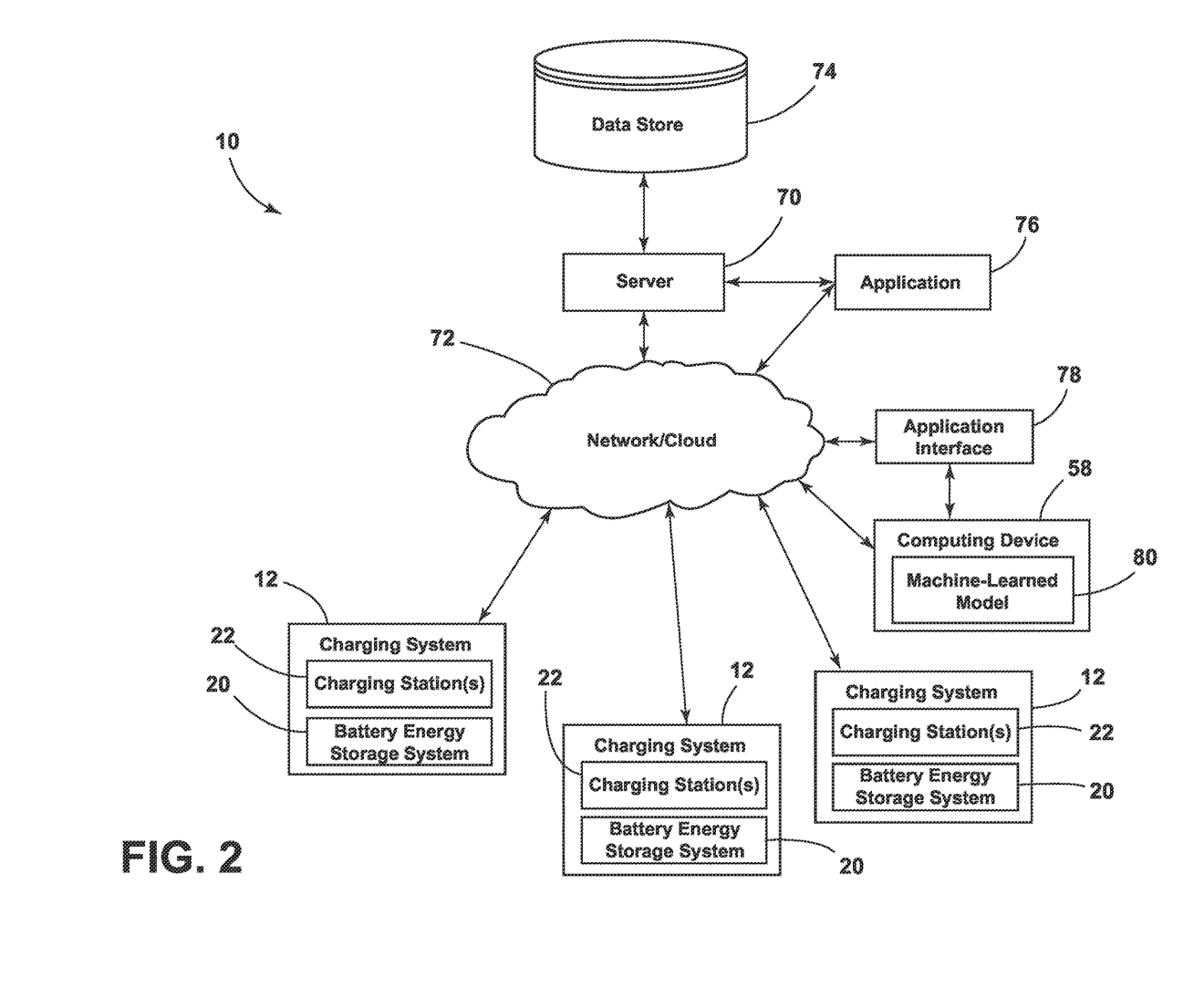
FIG. 2 is a block diagram illustrating a plurality of charging systems operably coupled with a remote server in accordance with aspects of the present subject matter.

Referring to FIG. 2, in some examples, a charging network 10 of one or more charging systems 12 is illustrated in accordance with various aspects of the present disclosure. In some examples, each of the charging systems 12 may be communicatively coupled with one or more remote sites, such as a remote server 70 via a network/cloud 72 to provide data and/or other information therebetween. The network/cloud 72 represents one or more systems by which the charging systems 12 and/or the computing device 58 may communicate with the remote server 70. The network/cloud 72 may be one or more of various wired or wireless communication mechanisms, including any desired combination of wired and/or wireless communication mechanisms and any desired network topology (or topologies when multiple communication mechanisms are utilized). Exemplary communication networks include wireless communication networks (e.g., using Bluetooth, IEEE 802.11, etc.), local area networks (LAN), and/or wide area networks (WAN), including the Internet and the Web, which may provide data communication services and/or cloud computing services. The Internet is generally a global data communications system. It is a hardware and software infrastructure that provides connectivity between computers. In contrast, the Web is generally one of the services communicated via the Internet. The Web is generally a collection of interconnected documents and other resources, linked by hyperlinks and URLs. In many technical illustrations when the precise location or interrelation of Internet resources is generally illustrated, extended networks such as the Internet are often depicted as a cloud (e.g. 72 in FIG. 2). The verbal image has been formalized in the newer concept of cloud computing. The National Institute of Standards and Technology (NIST) provides a definition of cloud computing as "a model for enabling convenient, on-demand network access to a shared pool of configurable computing resources (e.g., networks, servers, storage, applications, and services) that can be rapidly provisioned and released with minimal management effort or service provider interaction." Although the Internet, the Web, and cloud computing are not the same, these terms are generally used interchangeably herein, and they may be referred to collectively as the network/cloud 72.

The server 70 may be one or more computer servers, each of which may include at least one processor and at least one memory, the memory storing instructions executable by the processor, including instructions for carrying out various steps and processes. The server 70 may include or be communicatively coupled to a data store 74 for storing collected data as well as instructions for the one or more charging systems 12 with or without intervention from a user, the charging systems 12, and/or the computing device 58. Moreover, the server 70 may be capable of analyzing initial or raw data received from the one or more charging systems 12 and final or post-processing data (as well as any intermediate data created during data processing). Accordingly, the instructions provided to any one or more of the charging systems 12 may be determined and generated by the server 70 and/or one or more cloud-based applications 76.

With further reference to FIG. 2, the server 70 can also generally implement features that may enable the charging systems 12 to communicate with cloud-based applications 76. Communications from the charging systems 12 can be directed through the network/cloud 72 to the server 70 and/or cloud-based applications 76 with or without a networking device, such as a router and/or modem. Additionally, communications from the cloud-based applications 76, even though these communications may indicate one of the charging systems 12 as an intended recipient, can also be directed to the server 70. The cloud-based applications 76 are generally any appropriate services or applications 76 that are accessible through any part of the network/cloud 72 and may be capable of interacting with the charging systems 12.

In various examples, the charging systems 12 can be feature-rich with respect to communication capabilities, i.e. have built-in capabilities to access the network/cloud 72 and any of the cloud-based applications 76 or can be loaded with, or programmed to have such capabilities. The charging systems 12 can also access any part of the network/cloud 72 through industry-standard wired or wireless access points, cell phone cells, or network nodes. In some examples, users can register to use the remote server 70 through the charging systems 12, which may provide access to the charging systems 12 and/or thereby allow the server 70 to communicate directly or indirectly with the charging systems 12. According to some examples, the charging systems 12 can be preconfigured at the time of manufacture with a communication address (e.g. a URL, an IP address, etc.) for communicating with the server 70 and may or may not have the ability to upgrade or change or add to the preconfigured communication address.

Referring still to FIG. 2, when a new cloud-based application 76 is developed and introduced, the server 70 can be upgraded to be able to receive communications for the new cloud-based application 76 and to translate communications between the new protocol and the protocol used by the charging systems 12. The flexibility, scalability, and upgradeability of current server technology render the task of adding new cloud-based application protocols to the server 70 relatively quick and easy.

In several embodiments, an application interface 78 may be operably coupled with the cloud 72 and/or the application 76. The application interface 78 may be configured to receive data related to one or more charging systems 12. In some examples, at various predefined periods and/or times, the charging systems 12 may communicate with the server 70 through the network/cloud 72 to obtain the stored instructions, if any exist. Upon receiving the stored instructions, the charging systems 12 may implement the instructions.

In some instances, a computing device 58 may also access the server 70 to obtain information related to stored events. The computing device 58 may be a mobile device, tablet computer, laptop computer, desktop computer, watch, virtual reality device, television, monitor, or any other computing device 58 or another visual device. In some instances, the computing device 58 may implement a machine-learned model 80.

Referring now to FIG. 3, according to some aspects of the present disclosure, the computing system 32 can store or include one or more models, which may be machine-learned models 52. For example, the machine-learned model 52 may be a machine-learned future load profile estimation model. In various examples, the machine-learned future load profile estimation model can be configured to receive data and process input data to estimate an upcoming load profile, which may be based on a predicted number of EVs 14 for a future period.

Additionally or alternatively, the machine-learned model 52 may be a peak shaving estimation model that is configured to determine a peak shave target for the battery energy storage system 20 within each charging system 12. In several examples, the peak shaving estimation model may be configured to determine whether to supply energy from the battery energy storage system 20 and/or the grid 18 to each charging system 12 based on various factors, such as the power needs of the EV 14, the number of EVs 14 electrically coupled with the charging system 12, the total power needs of the EVs 14 in total, the power load stored within the battery energy storage system 20, the current cost per energy unit of energy from the grid 18, and/or any other factor. As such, the peak shaving estimation model may algorithmically determine whether to charge or discharge the battery energy storage system 20 and/or at what power load to achieve a desired peak shave performance.

Additionally or alternatively, the machine-learned model 52 may be implemented for use by a control model that seeks to operate the battery energy storage system 20 and issue power limits to each charger station with active sessions to maintain a power load from the grid interconnect 16 below a defined power value. In one non-limiting example, four vehicles 14 may each request one unit of energy from the charging station 22. However, the defined power value of the interconnect 16 for energy from the grid 18 may be limited to two units of energy. In such instances, the computing system 32 may instruct the battery energy storage system 20 to provide an additional two units of energy so that the vehicles 14 may be efficiently charged while maintaining the units of energy at or below the defined power value at the interconnect 16. As such, the control model may generate instructions for the charging system 12 that can include a charge/discharge command from the battery energy storage system 20 and/or charging parameters for each charging station 22.

In some examples, one or more of the models, which may be implemented by any module, can correspond to a linear machine-learned model. For instance, one or more of the models may be or include a linear regression model. A linear regression model may be used to intake the input data from the charging system(s) 12 and provide an intermittent or continuous outputs for the charging stations 22 and/or the battery energy storage system 20. Linear regression models may rely on various techniques, such as ordinary least squares, ridge regression, lasso, gradient descent, and/or the like. However, in other embodiments, one or more of the models may be or include any other suitable linear machine-learned model.

Alternatively, one or more of the models 52, 80 may correspond to a non-linear machine-learned model. For instance, one or more of the models may be or include a neural network such as, for example, a convolutional neural network. Example neural networks include feed-forward neural networks, recurrent neural networks (e.g., long short-term memory recurrent neural networks), convolutional neural networks, transformer neural networks (or any other models that perform self-attention), or other forms of neural networks. Neural networks can include multiple connected layers of neurons and networks with one or more hidden layers, which can be referred to as "deep" neural networks. Typically, at least some of the neurons in a neural network include non-linear activation functions.

As further examples, one or more of the models can be or can otherwise include various other machine-learned models, such as a support vector machine; one or more decision-tree based models (e.g., random forest models); a Bayes classifier; a K-nearest neighbor classifier; and/or other types of models including both linear models and non-linear models.

In some embodiments, the computing system 32 can receive the one or more machine-learned models 52, 80 from the computing device 58 over the network 206 and can store the one or more machine-learned models 52 in the memory 36. The computing system 32 can then use or otherwise run the one or more machine-learned models 52 (e.g., by processor(s) 34).

The machine learning computing device 58 includes one or more processors 60 and memory 62. The one or more processors 60 can be any suitable processing device such as described with reference to processor(s) 34. The memory 62 can include any suitable storage device such as described with reference to memory 36. The memory 62 can store information that can be accessed by the one or more processors 60. For instance, the memory 62 (e.g., one or more non-transitory computer-readable storage mediums, memory devices) can store data 82 that can be obtained, received, accessed, written, manipulated, created, and/or stored. In some embodiments, the machine learning computing device 58 can obtain data from one or more memory device(s) that are remote from the computing device 58.

The memory 62 can also store computer-readable instructions 84 that can be executed by the one or more processors 60. The instructions 84 can be software written in any suitable programming language or can be implemented in hardware. Additionally, or alternatively, the instructions 84 can be executed in logically and/or virtually separate threads on the processor(s) 60. For example, the memory 62 can store instructions 84 that when executed by the one or more processors 60 cause the one or more processors 60 to perform any of the operations and/or functions described herein.

In some embodiments, the machine learning computing device 58 includes one or more server computing devices. If the machine learning computing device 58 includes multiple server computing devices, such server computing devices can operate according to various computing architectures, including, for example, sequential computing architectures, parallel computing architectures, or some combination thereof.

In addition or alternatively to the model(s) 52 at the computing system 32, the machine learning computing device 58 can include one or more machine-learned models 80. For example, the model 80 can be the same as described above with reference to the model(s) 52.

In some embodiments, the machine learning computing device 58 can communicate with the computing system 32 according to a client-server relationship. For example, the machine learning computing device 58 can implement the machine-learned model 80 to provide a web-based service to the computing system 32. For example, the web-based service can provide data analysis for determining a charge/discharge command for the battery energy storage system 20 and/or one or more charging parameters for respective charging stations 22.

Thus, machine-learned models 52 can be located and used at the computing system 32, and/or machine-learned models 80 can be located and used at the machine learning computing device 58.

In some embodiments, the machine learning computing device 58 and/or the computing system 32 can train the machine-learned models 52, 80 through the use of a model trainer 86. The model trainer 86 can train the machine-learned models 52, 80 using one or more training or learning algorithms. One example training technique is the backward propagation of errors ("backpropagation"), or other training techniques can be used.

In some embodiments, the model trainer 86 can perform supervised training techniques using a set of training data 88. For example, the training data 88 can include operational data from the charging systems 12 that is associated with a known value for the target parameter (e.g., a power load, an energy source to supply the energy (e.g., the grid 18 and/or the battery energy storage system 20), a voltage, a current, an amount of time, etc.). For instance, operational data associated with the training dataset may be continuously collected, generated, and/or received while the charging system 12 is being used via monitoring means to provide matching or correlation datasets between the power management module data and the charging parameter data. In other embodiments, the model trainer 86 can perform unsupervised training techniques. The model trainer 86 can perform several generalization techniques to improve the generalization capability of the models being trained. Generalization techniques include weight decays, dropouts, or other techniques. The model trainer 86 can be implemented in hardware, software, firmware, or combinations thereof.

Thus, in some embodiments, the models can be trained at a centralized computing system (e.g., at "the factory") and then distributed to (e.g., transferred to for storage by) specific controllers through a communications interface 98. Additionally or alternatively, the models can be trained (or re-trained) based on additional training data generated by users of the system. This process may be referred to as the "personalization" of the models and may allow users to further train the models to provide improved (e.g., more accurate) predictions for unique field and/or machine conditions experienced by such users.

FIGS. 1-3 illustrate example computing systems that can be used to implement the present disclosure. Other computing systems can be used as well. For example, in some embodiments, the computing system 32 can include the model trainer 86 and the training dataset 88. In such embodiments, the machine-learned models 52 can be both trained and used locally at the computing system 32. As another example, in some embodiments, the computing system 32 is not connected to other computing systems.

Figure 4:
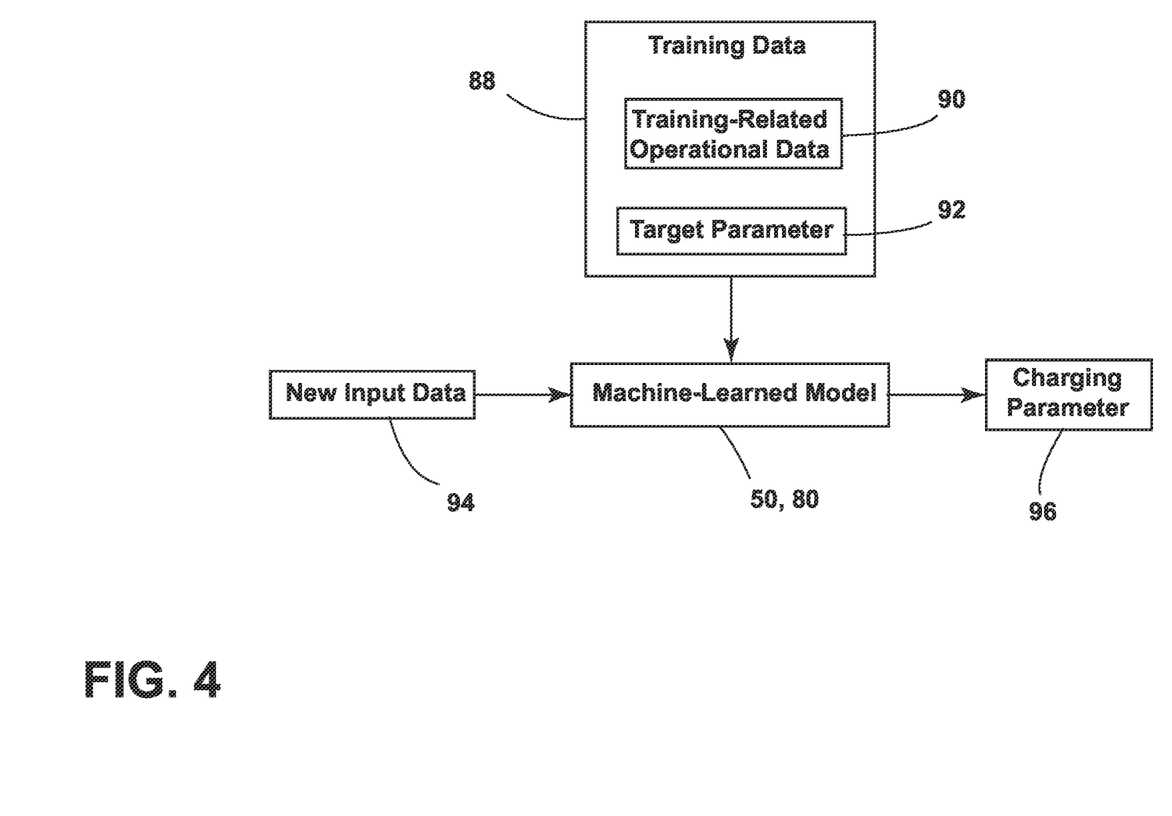
FIG. 4 illustrates a schematic view of a flow diagram for training a machine-learned model in accordance with aspects of the present subject matter.

Referring now to FIG. 4, a schematic view illustrating a flow diagram for training a machine-learned model 52, 80, such as the machine-learned mass estimation models 52, 80 described above, is illustrated in accordance with aspects of the present subject matter. As indicated above, the model(s) 52, 80 can be trained by a model trainer 86 that uses training data 88 and performs any suitable supervised and/or unsupervised training techniques. In several embodiments, as shown in FIG. 4, the model(s) 52, 80 may be trained using one or more training datasets including operating data 90 that is associated with a known value for the target parameter 92 (i.e., the charging parameter). For instance, the operating data 90 associated with the training dataset may be continuously collected, generated, and/or received (e.g., via the charging station 22 and/or the power management module 30).

By analyzing the operating data 90 in combination with the known or target parameters 92 for the charging parameter, suitable correlations may be established between the operating data (including certain subsets of the operating data) and the charging parameter to develop a machine-learned model 52, 80 that can accurately predict the charging parameter based on new datasets including the same type of operating data. For instance, in some implementations, suitable correlations may be established between the charging parameter and various operation-related conditions associated with or included within the operating data, such as various sensed, calculated, and/or known parameters, settings, machine configurations, and/or operational statuses associated with the charging stations 22.

As shown in FIG. 4, once the machine-learned model 52, 80 has been trained, new datasets 94 can be input into the model to allow the model to predict or determine new estimated charging parameters 96 for the target charging parameter. For instance, upon training the model, the operating data collected, generated, and/or received during a subsequent operation can be input into the model to provide operating data associated with such operation. For instance, the model may be used to predict or determine charging sessions at a given frequency (e.g., the frequency at which a new charging session begins and/or the power load desired during each charging session) to allow such parameters to be continuously monitored as the operation is being conducted. As indicated above, such operating data may then be used by the charging system 12 to determine one or more charging parameters for each charging station 22, to generate a charge/discharge command of the battery energy storage system 20, and/or to execute any other suitable control actions.

Figure 5:
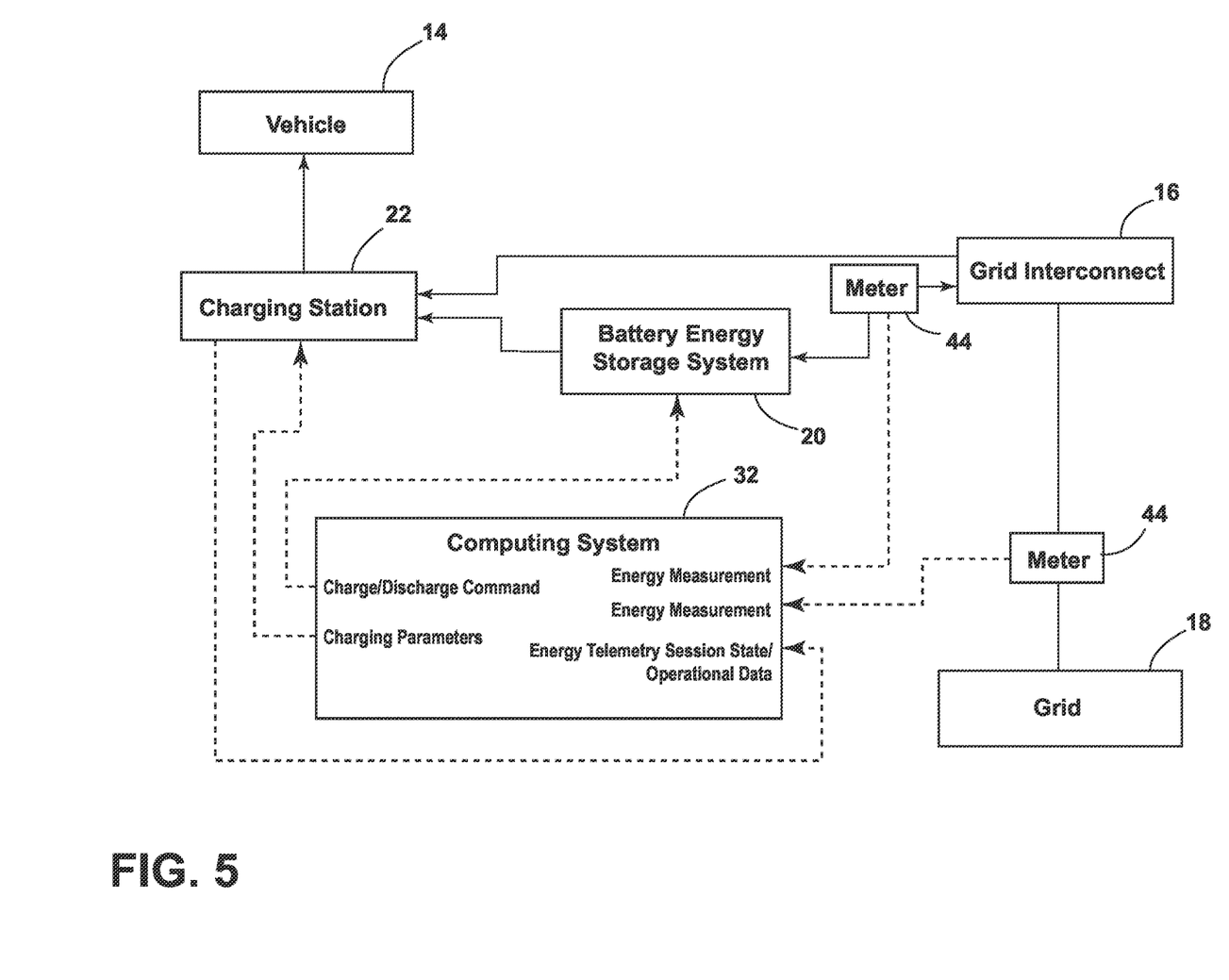
FIG. 5 is a schematic diagram of the charging system in accordance with aspects of the present disclosure.

Referring now to FIG. 5, as provided herein, the grid 18 and/or the battery energy storage system 20 may provide electrical energy to one or more charging stations 22. As shown, a first meter 44 may be positioned between the grid 18 and the grid interconnect 16 to measure the amount of electrical energy that is provided to the grid interconnect 16. Additionally or alternatively, a second meter 44 may be positioned between the grid interconnect 16 and the battery energy storage system 20 to measure an amount of electrical energy that is transferred from the grid interconnect 16 to the battery energy storage system 20 and/or from the battery energy storage system 20 to the grid interconnect 16. In addition, each charging station 22 may provide operation data, such as energy telemetry session state data to the computing system 32.

Based on the received inputs, the computing system 32 may generate one or more outputs. For example, the inputs may be leveraged by a data analytics model to generate a predicted of vehicle flow and/or a predicted power load during a defined period (e.g., which may be a future period). In such instances, the computing system 32 may determine an energy source for each charging station 22 based on the predicted vehicle flow. For instance, when an increase in traffic is likely to occur based on the model, the charging station 22 may generally rely on energy from the grid 18. Conversely, when a decrease in traffic is likely to occur based on the model, the charging station 22 may rely on energy from the battery energy storage system 20. It will be appreciated that an upcoming increase or decrease in traffic may have any other impact on the charging parameters without departing from the scope of the present disclosure.

Additionally or alternatively, the computing system 32 may leverage a peak shaving estimation model to produce a peak shave target for the battery energy storage system 20. The peak shave target may be consumed by the battery, which can algorithmically determine whether to charge or discharge and at what power to achieve peak shave performance. In some instances, when used in conjunction with the predicted vehicle flow, which may be a contributor to generating transient loads seen in a load profile of the charging system 12, the charging system 12 can provide a stronger, more sensitive prediction of peak loads and, therefore, can allow a more aggressive peak shave target, ultimately resulting in increased economic benefit to the customer.

Additionally or alternatively, the computing system 32 may leverage a closed-loop control model that seeks to operate the battery energy storage system 20 and issue power limits to the charging stations 22 with active sessions to maintain a power load from the grid interconnect 16 below a defined power value. For example, in some instances, four vehicles 14 may each request one unit of energy from the charging station 22. However, the defined power value of the interconnect 16 for energy from the grid 18 may be limited to two units of energy. In such instances, the computing system 32 may instruct the battery energy storage system 20 to provide an additional two units of energy so that the vehicles 14 may be efficiently charged while maintaining the units of energy at or below the defined power value at the interconnect 16. As such, the control model may generate instructions for the charging system 12 that can include a charge/discharge command from the battery energy storage system 20 and/or charging parameters for each charging station 22.

Figure 6:
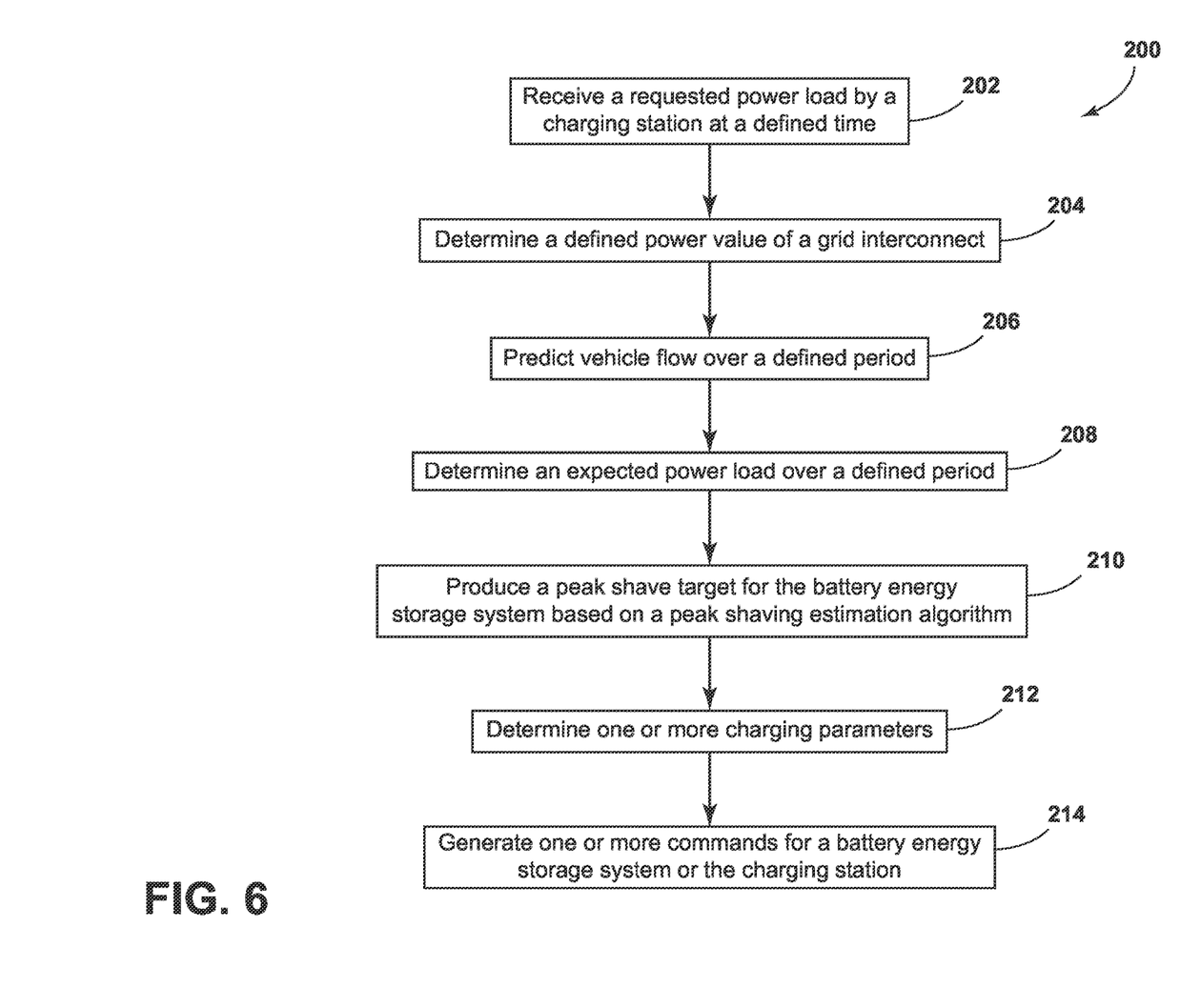
FIG. 6 is a method for operating the charging network in accordance with aspects of the present disclosure.

Referring now to FIG. 6, a method 200 for operating a charging network is illustrated in accordance with aspects of the present subject matter. In general, the method 200 will be described herein with reference to the charging network and one or more charging systems 12 described above with reference to FIGS. 1-5. However, the disclosed method 200 may generally be utilized with any suitable system. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As illustrated in FIG. 6, at (202), the method 200 can include receiving a requested power load by a charging station at a defined time. The power load may be defined by received by a remote power management module. As provided herein, the remote power management module may perform several different functions, including, but not limited to, providing the charging system with the statuses of the remote EVs; controlling the amount, direction, and timing of power being transferred into or out of a remote EV; providing metering of power being transferred into or out of a remote EV; providing safety measures during power transfer and changes of conditions in the power grid; logging activities; and providing self-contained control of power transfer and safety measures when communication with the charging system is interrupted.

At (204), the method 200 can include determining a defined power value of a grid interconnect. For example, as provided herein, the defined power value may be a maximum power load that may be provided by the power source to the grid interconnect. Additionally or alternatively, the defined power value may be a maximum power load that is to be received through the grid interconnect based on various factors, such as the power needs of the EV 14, the number of EVs 14 electrically coupled with the charging system 12, the total power needs of the EVs 14 in total, the power load stored within the battery energy storage system 20, the current cost per energy unit of energy from the grid 18, and/or any other factor.

At (206), the method 200 can include predicting vehicle flow over a defined period. For instance, the method can include using both historical data from one or more charging systems and/or external data to predict or determine charging sessions at defined time (e.g., the frequency at which a new charging session begins and/or the power load desired during each charging session). Likewise, at (208), the method 200 can include determining an expected power load over a defined period.

At (210), the method 200 can include producing a peak shave target for the battery energy storage system based on a peak shaving estimation algorithm. As provided herein, the peak shaving algorithm may determine whether to charge or discharge the battery energy storage system 20 and/or at what power load to achieve a desired peak shave performance.

At (212), the method may include determining one or more charging parameters for each respective charging station. In some instances, the one or more charging parameters may be based at least partially on the requested power load by the charging station at the defined time and the defined power value of the grid interconnect. Additionally or alternatively, the one or more charging parameters may be based at least partially on the predicted vehicle flow, the expected power load over a defined period, the peak shave target for the battery energy storage system.

At (214), the method 200 can include generating one or more commands for a battery energy storage system or the charging station to provide a power load based on the one or more charging parameters. In some instances, the one or more commands for the battery energy storage system to provide a power load based on the one or more charging parameters further includes providing an additional amount of power to supplement power provided by the grid.

In various examples, the method 200 may implement machine learning methods and algorithms that utilize one or several vehicle learning techniques including, for example, decision tree learning, including, for example, random forest or conditional inference trees methods, neural networks, support vector machines, clustering, and Bayesian networks. These algorithms can include computer-executable code that can be retrieved by the computing system and/or through a network/cloud and may be used to evaluate and update an amount of movement of the actuators. In some instances, the vehicle learning engine may allow for changes to the actuators to be performed without human intervention.

It is to be understood that the steps of any method disclosed herein may be performed by a computing system upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as vehicle code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A charging network comprising:
   a charging system configured to be electrically coupled with a power source, the charging system comprising:
   a grid interconnect;
   a battery energy storage system electrically coupled with the grid interconnect;
   a first charging station electrically coupled with the grid interconnect and the battery energy storage system in parallel;
   a second charging station electrically coupled with the grid interconnect and the battery energy storage system in parallel; and
   a computing system operably coupled with the battery energy storage system, the first charging station, the second charging station, the computing system including a processor and associated memory, the memory storing instructions that, when implemented by the processor, configure the computing system to:
   determine a requested power load by the first charging station and the second charging station at a defined time;
   determine a defined power value of the grid interconnect;
   determine one or more charging parameters based at least in part on the requested power load by the first charging station and the second charging station at the defined time to maintain power from the grid interconnect at a defined power value;
   generate a first command for the first charging station based on the one or more charging parameters, the first command defining a first power load, the first power load including a portion of power from the grid interconnect and a portion from the battery, energy storage system; and
   generate a second command for the second charging station based on the one or more charging parameters, the second command defining a second power load, wherein the second power load is varied from the first power load, and wherein the second power load is configured to be provided to the second charging station simultaneously with the first power load being provided to the first charging station, and wherein at least one of the first load or the second load is determined prior to supplying power to at least one of the first load or the second load.

2. The charging network of claim 1, wherein the first charging station and the second charging station are coupled with the grid interconnect in parallel.

3. The charging network of claim 1, wherein the first charging station and the second charging station are coupled with the battery energy storage system in parallel.

4. The charging network of claim 1, wherein a machine-learned model is used to determine the one or more charging parameters.

5. The charging network of claim 1, wherein the second power load is varied from the first power load based at least in part on an initiation of a charging session of the first charging station being varied from an initiation of a charging session of the second charging station.

6. A charging network comprising:
   a charging system configured to be electrically coupled with a power source, the charging system comprising:
   a grid interconnect;
   a battery energy storage system electrically coupled with the grid interconnect;
   a first charging station electrically coupled with the grid interconnect and the battery energy storage system in parallel;
   a second charging station electrically coupled with the grid interconnect and the battery energy storage system in parallel; and
   a computing system operably coupled with the battery energy storage system, the first charging station, the second charging station, the computing system including a processor and associated memory, the memory storing instructions that, when implemented by the processor, configure the computing system to:

determine a requested power load by the first charging station and the second charging station at a defined time;

determine a defined power value of the grid interconnect;

determine one or more charging parameters based at least in part on the requested power load by the first charging station and the second charging station at the defined time; wherein the one or more charging parameters includes a respective power limit for the first charging station and the second charging station to maintain the power load from the grid interconnect below the defined power value;

generate a first command for the first charging station based on the one or more charging parameters, the first command defining a first power load; and generate a second command for the second charging station based on the one or more charging parameters, the second command defining a second power load, wherein the second power load and the first power load, in combination, exceed the defined power value of the grid interconnect.

7. The charging network of claim 6, wherein the computing system is further configured to:

generate one or more commands for the battery energy storage system to provide at least a portion of the first power load based on the first command or the second power load based on the second command.

8. The charging network of claim 6, wherein the one or more charging parameters are at least partially based on a predicted vehicle flow over a defined period.

9. The charging network of claim 6, wherein the one or more charging parameters are at least partially based on an expected power load over a defined period.

10. The charging network of claim 6, wherein the one or more charging parameters are at least partially based on a peak shaving estimation algorithm that produces a peak shave target for the battery energy storage system.

11. The charging network of claim 6, wherein the power load provided to the first charging station and the second charging station is varied over time.

12. The charging network of claim 6, wherein the battery energy storage system is remote from the first charging station and the second charging station.

13. A charging network comprising:

a charging system configured to be electrically coupled with a power source, the charging system comprising:

a grid interconnect;

a battery energy storage system electrically coupled with the grid interconnect;

a first charging station electrically coupled with the grid interconnect and the battery energy storage system in parallel;

a second charging station electrically coupled with the grid interconnect and the battery energy storage system in parallel; and a computing system operably coupled with the battery energy storage system, the first charging station, the second charging station, the computing system including a processor and associated memory, the memory storing instructions that, when implemented by the processor, configure the computing system to:

determine a requested power load by the first charging station and the second charging station at a defined time;

determine a defined power value of the grid interconnect;

determine one or more charging parameters based at least in part on the requested power load by the first charging station and the second charging station at the defined time, wherein the one or more charging parameters includes a respective power limit for the first charging station and the second charging station to maintain the power load from the grid interconnect below the defined power value;

generate a first command for the battery energy storage system based on the one or more charging parameters, the first command defining a first power load; and.

generate a second command for the battery energy storage system based on the one or more charging parameters, the second command defining a second power load, wherein the second power load and the first power load, in combination, exceed the defined power value of the grid interconnect.

14. The charging network of claim 13, wherein the computing system is further configured to:

generate one or more commands for the battery energy storage system to provide at least a portion of the first power load based on the first command or the second power load based on the second command.

15. The charging network of claim 13, wherein the one or more charging parameters are at least partially based on a predicted vehicle flow over a defined period.

16. The charging network of claim 13, wherein the one or more charging parameters are at least partially based on an expected power load over a defined period.

17. The charging network of claim 13, wherein the one or more charging parameters are at least partially based on a peak shaving estimation algorithm that produces a peak shave target for the battery energy storage system.

18. The charging network of claim 13, wherein the second power load and the first power load, in combination, provided to the charging station is varied over time.

19. The charging network of claim 13, wherein the battery energy storage system is remote from the first charging station and the second charging station.

* * * * *